United States Patent [19]

Ogura

[11] Patent Number: 5,534,668
[45] Date of Patent: * Jul. 9, 1996

[54] DEADWEIGHT DROPPING TYPE WAVE SOURCE

[75] Inventor: Kimio Ogura, Saitama, Japan

[73] Assignee: Oyo Corporation, Tokyo, Japan

[ * ] Notice: The portion of the term of this patent subsequent to Jul. 8, 2013, has been disclaimed.

[21] Appl. No.: 379,207

[22] Filed: Jan. 27, 1995

Related U.S. Application Data

[63] Continuation of Ser. No. 84,263, Jul. 8, 1993, Pat. No. 5,416,281.

[30] Foreign Application Priority Data

| Nov. 8, 1991 | [JP] | Japan | 3-320951 |
| Sep. 16, 1992 | [JP] | Japan | 4-272278 |
| Sep. 17, 1992 | [JP] | Japan | 4-273676 |
| Sep. 29, 1992 | [JP] | Japan | 4-283956 |

[51] Int. Cl.⁶ ............. G01V 1/02; G01V 1/147; G01V 1/40
[52] U.S. Cl. ............... 181/106; 181/121; 175/1
[58] Field of Search .................. 181/106, 113, 181/121, 401; 175/1; 367/25, 75, 911

[56] References Cited

U.S. PATENT DOCUMENTS

| 4,252,210 | 2/1981 | Sodich | 181/119 |
| 4,383,591 | 5/1983 | Ogura | 181/106 |
| 4,648,478 | 3/1987 | Dedole et al. | 181/106 |
| 4,671,379 | 6/1987 | Kennedy et al. | 181/106 |
| 4,773,501 | 9/1988 | Dedole et al. | 181/106 |
| 4,796,723 | 1/1989 | Laurent et al. | 181/102 |
| 4,830,927 | 5/1989 | Fukahori et al. | 428/495 |
| 5,416,281 | 5/1995 | Ogura | 181/106 |

FOREIGN PATENT DOCUMENTS

| 58-52191 | 11/1983 | Japan . |
| 61-43669 | 9/1986 | Japan . |
| 62-14791 | 4/1987 | Japan . |
| 62-14792 | 4/1987 | Japan . |
| 1-302193 | 12/1989 | Japan . |

*Primary Examiner*—Ian J. Lobo
*Attorney, Agent, or Firm*—Wenderoth, Lind & Ponack

[57] ABSTRACT

In a bore holes, a plurality of resilient members and plates are piled up alternately to form a laminate, and a deadweight is dropped onto the laminate. The resilient members are deformed due to the impact force of the dropped deadweight to cause bore hole water among the plates to be forced out in the outward direction, and elastic waves to occur in the bore hole wall.

16 Claims, 14 Drawing Sheets

FIG. 1A
FIG. 1B
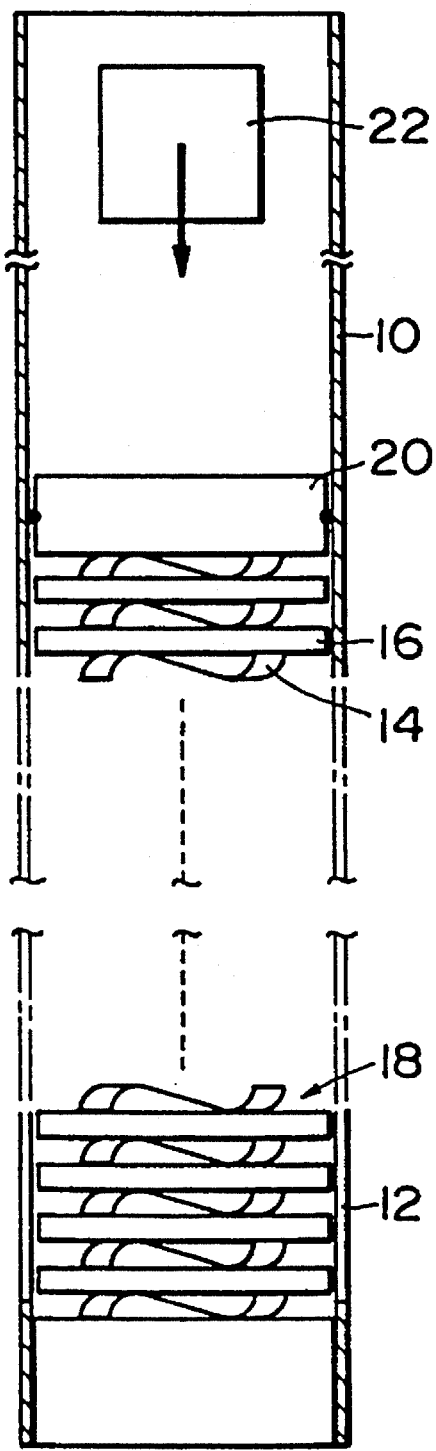
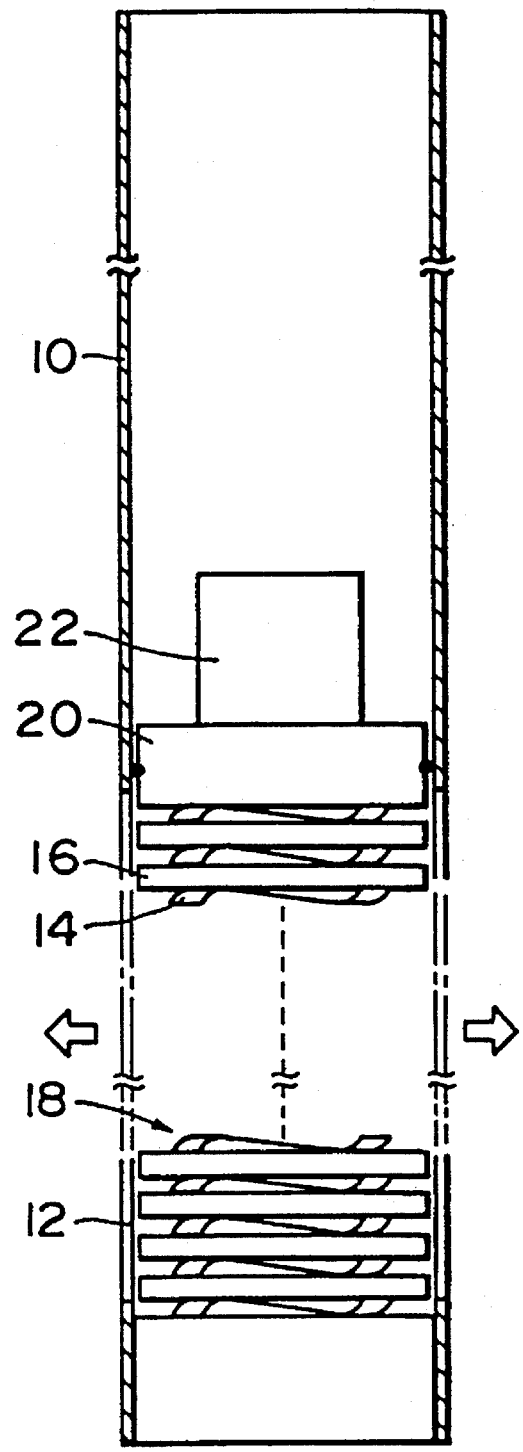

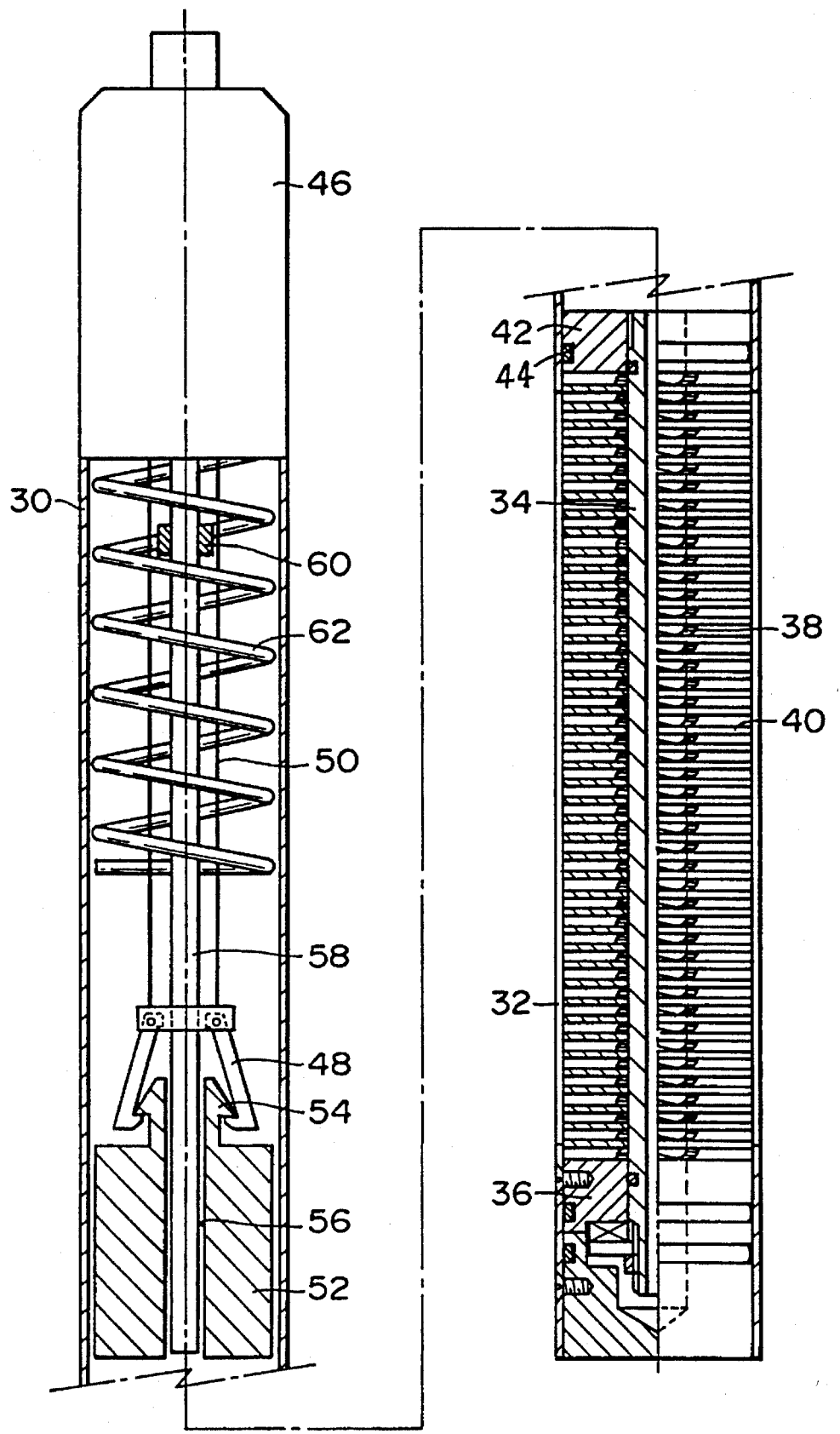

FIG. 8A
FIG. 8B
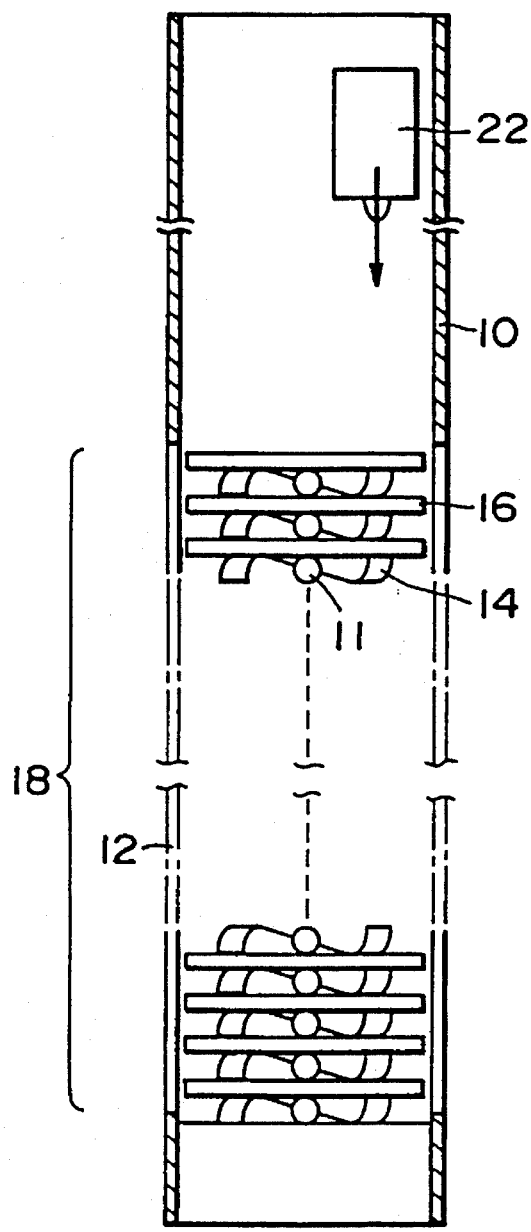
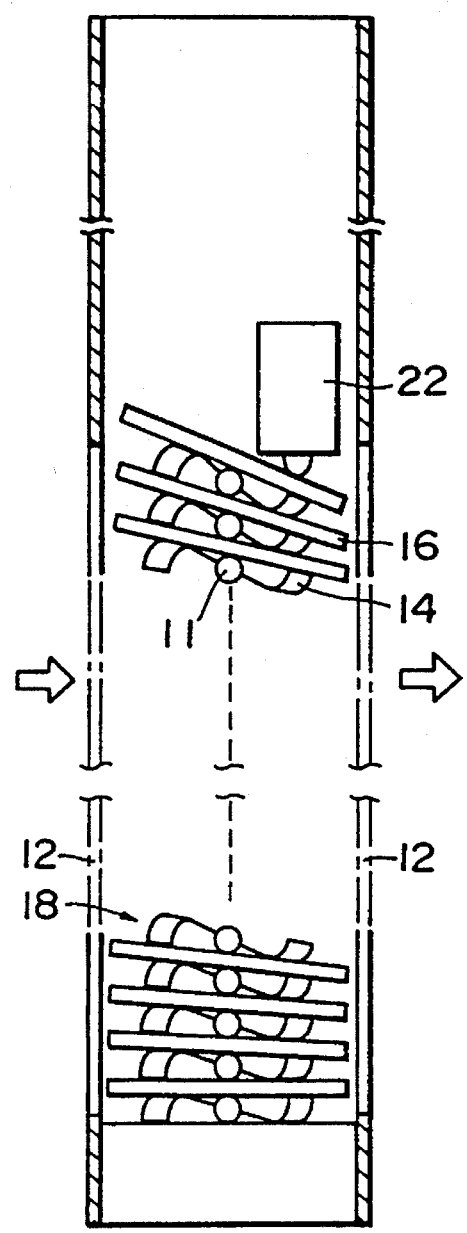

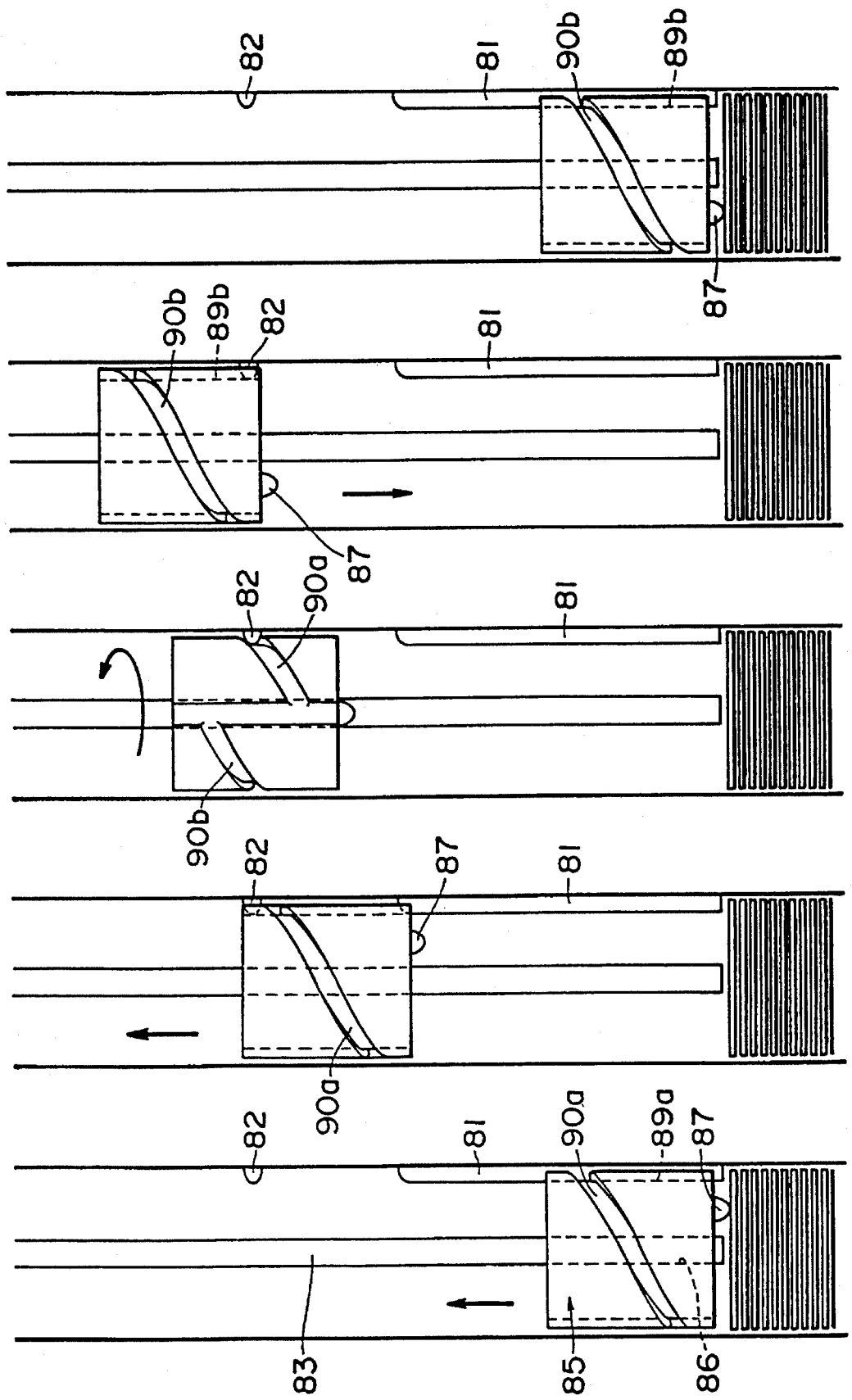

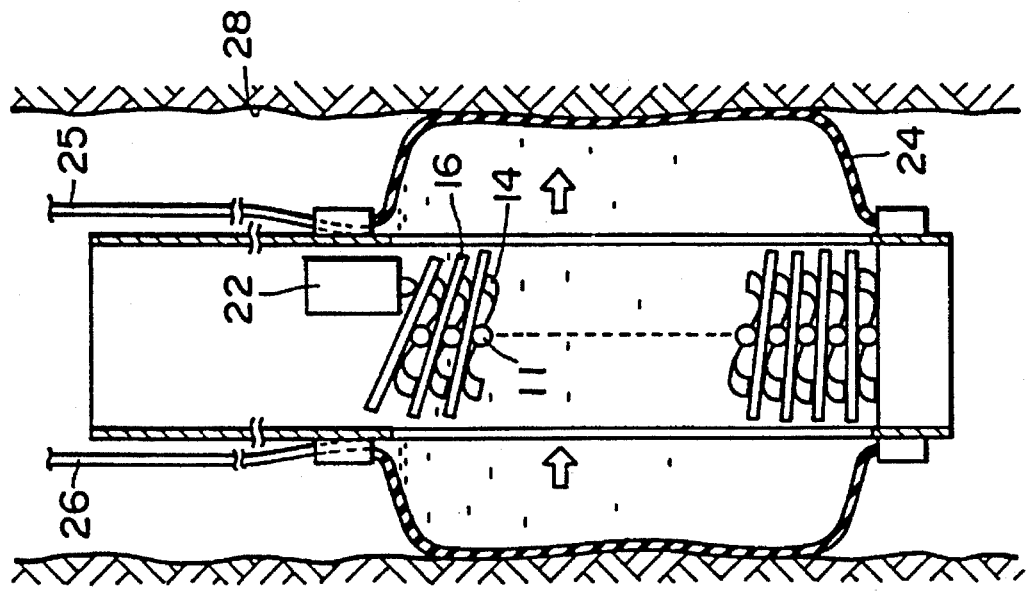
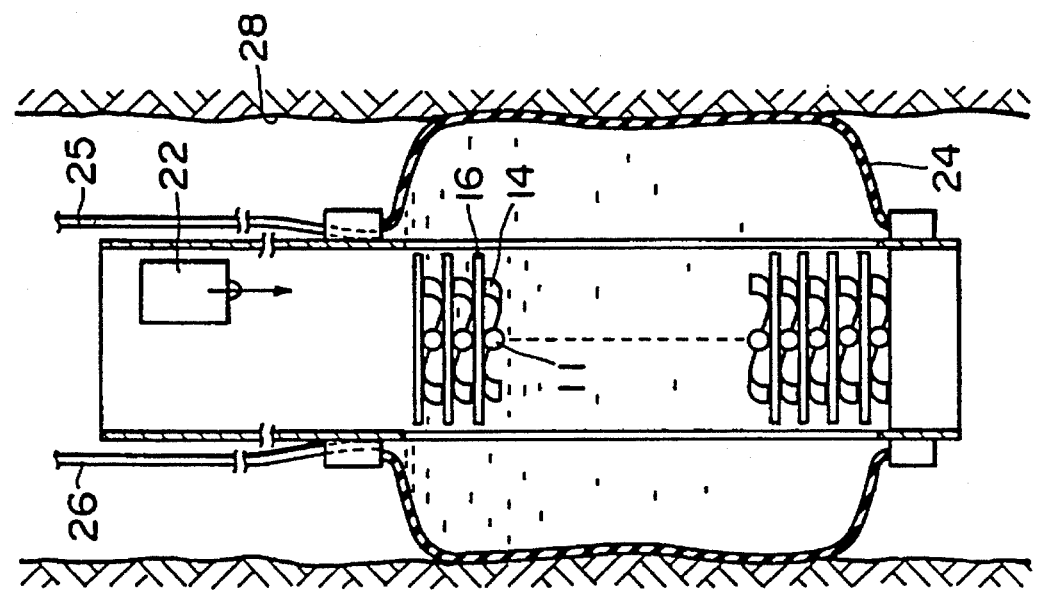

DEADWEIGHT DROPPING TYPE WAVE SOURCE

This is a continuation application of Ser. No. 08/084,263, filed Jul. 8, 1993 now U.S. Pat. No. 5,416,281.

FIELD OF THE INVENTION

The present invention relates to a wave source provided in a bore hole, and more particularly to a high-output inside bore hole wave source for generating elastic waves in the wall of a bore hole by dropping a deadweight onto a laminate of a plurality of alternately piled resilient members and plate members so as to deform the resilient members. This wave source is effectively applied to a velocity logging system used in a water-holding bore hole, and to the tomography for three-dimensionally analyzing the wave characteristics of a wide-range of ground.

BACKGROUND OF THE INVENTION

The wave characteristics of the ground formation constitute important basic data for the antiseismic designing of various kinds of buildings and and various kinds of structures formed by civil engineering. In order to investigate the elastic properties of the underground, a PS (P waves and S waves) velocity logging system for directly measuring the propagation of an elastic wave (P wave and S wave) in a bore hole made in the ground is used. The velocity logging is a technique for determining, on the basis of a waveform record, the arrival time of the elastic waves sent out from a wave source to a wave receiver.

Various types of bore hole wave sources have heretofore been developed. Typical examples of bore hole wave sources are disclosed in Japanese Patent Publication Nos. 58-52191/1983, 61-43669/1986, 62-14791/1987 and 62-14792/1987, and U.S. Pat. No. 4,383,591. All of these apparatuses consist basically of a structure provided with a movable member (hammer) which can be moved freely in the direction perpendicular to the axis of a bore hole, and a mechanism for driving the movable member. Such a wave source is set in a water-holding bore hole, and a vibratory force is exerted on a wall surface of the bore hole in a direction perpendicular to the axis of the bore hole by momentarily driving the movable member. The driving mechanism in use usually consists of an electromagnetic solenoid.

However, the conventional electromagnetic hammer type bore hole wave source is driven by an electromagnetic solenoid, and the diameter of the bore hole is comparatively small in general. Therefore, since the outer diameter of the wave source cannot be increased, there is a limit to the magnitude of a vibratory force which can be generated, and the range of application of the wave source is restricted. This wave source is effectively used, for example, in the case where PS wave logging operations are carried out at various depths with a series of probes, in each of which a wave source and a wave receiver are incorporated, inserted in a bore hole without being fixed to a wall surface of the bore hole. However, it is difficult to apply this wave source which has only a limited range of wave propagation to the case where inter-bore hole velocity measurement using two bore holes is conducted.

In recent years, the tomographic techniques for measuring the velocity of elastic waves between two bore holes, and three-dimensionally expressing (tomographically imaging) the wave characteristics over a wide range of underground by using computer-aided data processing techniques have been introduced. According to these techniques, a wave source is set in a wave generating bore hole, one of two bore holes, and multiple connected wave receivers are inserted in a wave receiving bore hole, the other of the two bore holes. The velocity of elastic waves is then measured with the wave source setting position (depth) varied, and the wave generating bore hole and wave receiving bore hole are interchanged with each other. However, when the above-mentioned conventional electromagnetic hammer type bore hole wave source is used, a signal can travel an inter-bore hole distance of only up to 10 m. Consequently, it becomes necessary to make a larger number of bore holes, and the conventional wave source encounters difficulties in practical use.

There is an explosive as a known wave source having a large vibratory force. When an explosive is used, elastic waves reach an object position even if the distance between two bore holes is around several hundred meters. However, the use of an explosive causes the destruction of a bore hole wall. When the measurement of the velocity of elastic waves is conducted by interchanging the wave generating bore hole and wave receiving bore hole with each other, an already-destroyed wave generating bore hole cannot be used as a wave receiving bore hole even if the wave generating point can be shifted in order from a larger depth portion of the bore hole to a smaller depth portion thereof. After all, the necessary measurement cannot be conducted in practice. Moreover, since many limitations are placed on the use of an explosive, it is substantially impossible to use an explosive, especially, in an urban district.

SUMMARY OF THE INVENTION

A primary object of the present invention is to provide an improved bore hole wave source free from these drawbacks encountered in the prior art wave source.

Another object of the present invention is to provide a safe and easily usable bore hole wave source which can provide a large vibratory force even in a bore hole of a small diameter and having high resolution (resolving power) owing to the high-frequency components of the wave.

Still another object of the present invention is to provide an S wave generating bore hole wave source which can radiate an S wave effectively while restraining the radiation of a P wave.

The deadweight dropping type bore hole wave source according to the present invention has a laminate formed by a plurality of alternately piled resilient members and plate members, and a deadweight positioned above the laminate and adapted to be dropped thereonto.

In another mode of the present invention, a wave source can be formed by providing such a laminate in the lower portion of a cylindrical casing, and providing a piston member which is vertically movable in the cylindrical casing on the laminate, and setting such a deadweight which is vertically movable in the cylindrical casing toward the piston member.

In still another mode of the present invention, a wave source can be formed by piling up a plurality of annular plate members and resilient members alternately, and inserting fulcrum members between adjacent plate members so that the fulcrum members extend in the same direction.

In a further mode of the present invention, a wave source is formed by providing a water-tight expansion cover so as to surround the laminate, and a liquid supply device in the interior of this cover.

BRIEF DESCRIPTION OF THE DRAWINGS

FIGS. 1A and 1B schematically illustrate a construction of a deadweight dropping type bore hole wave source according to the present invention, FIG. 2 is a partially sectioned side elevation showing a more specific construction of a first embodiment of the wave source according to the present invention, FIGS. 8A and 8B are diagrams illustrating the construction of a fourth embodiment of the wave source according to the present invention.

FIGS. 13A–13E illustrate an operational mode of a deadweight dropping mechanism, FIGS. 14A, 14B and 14C schematically illustrate the construction and operation of the wave source of another embodiment which is used effectively for a velocity logging operation in a non-water-holding bore hole according to the present invention, FIGS. 16A and 16B are diagrams showing a modified example of the embodiment of FIGS. 14A–14C, and the operations thereof.

PREFERRED EMBODIMENTS OF THE INVENTION

Figure 2A:
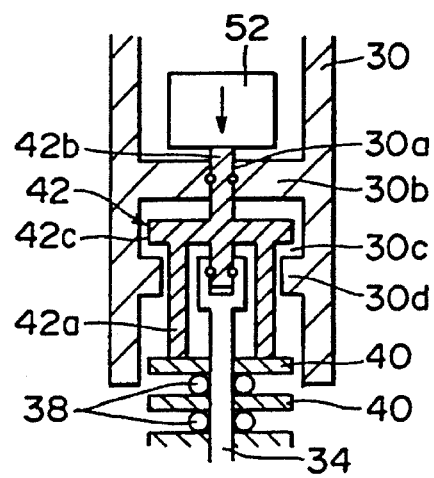
FIG. 2A is a sectional view showing a preferred example of the construction of a piston shown in FIG. 2.

The wave source according to the present invention provides a construction which is, as schematically shown in FIGS. 1A and 1B, provided with a cylindrical casing 10, a piston member 20 which is positioned on a laminate 18 formed by alternately piling up a plurality of resilient members 14 and plate members 16 and set in the lower portion of the casing 10. The piston member 20 is adapted to be moved freely in the vertical direction in the casing 10, and a deadweight 22 is adapted to be dropped from the upper portion of the interior of the casing 10 toward the piston member 20. The lower portion of the cylindrical casing 10 may be extended, and openings 12 in the form, for example, of axially elongated slits are provided in the circumferential wall of the extended portion so as to support the laminate 18 therein. A plurality of guide rods (not shown) may be provided in the lower portion of the cylindrical casing, and these rods are inserted through holes made in the plate members 16 so as to restrict the movements of the plate members 16 in their planes.

The resilient members 14 consist, for example, of wave washers or rings (for example, O-rings and rubber bushings) of a rubber-like material, and the resilient members 14 and annular metal plate members 16, the total number of which is around 10–60, are alternately piled up. The cylindrical casing 10 is provided at its inner upper end portion with a mechanism for holding up and releasing the deadweight 22, in such a manner that the mechanism is joined to the deadweight. This mechanism may be of a type which utilizes gravity as a self-dropping force. A spring means can be incorporated in the mechanism for applying a downward resilient force to the deadweight 22 so as to forcibly drop the deadweight, and this can increase a wave generating force.

The deadweight 22 may be formed so that it drops directly onto the upper surface of the piston member 20. The deadweight 22 may also be formed so that a drop impact force thereof is transmitted to the piston member 20 via a liquid in a liquid reservoir provided on the piston member 20. In such cases, a dropping deadweight is preferably received by a spring or a rubber film.

When the deadweight 22 in the condition shown in FIG. 1A falls onto the piston member 20, the resilient members 14 are deformed suddenly due to the impact force as shown in FIG. 1B, and the laminate 18 consisting of the resilient members 14 and plate members 16 contracts in the axial direction. Consequently, the bore hole water among the plate members 16 is forced out (in the direction of arrows) through the openings 12 to generate elastic waves in the bore hole wall (not shown).

When the deadweight 22 is urged downward by the force of a spring, this force is added to the self-dropping force thereof. As a result, the impact force exerted on the piston member 20 increases, and the wave generating force also becomes larger. When the openings in the cylindrical casing 10 in the wave source according to the present invention are provided in two opposite portions thereof or only one portion thereof, a wave having a high directivity is produced. When this apparatus is formed so that the dropping force of the deadweight 22 is transmitted to the piston member 20 via a liquid in a liquid reservoir provided on the piston member 20, the deadweight 22 does not directly collide with the piston member 20, so that the deformation of the piston member 20 can be prevented.

Figure 3:
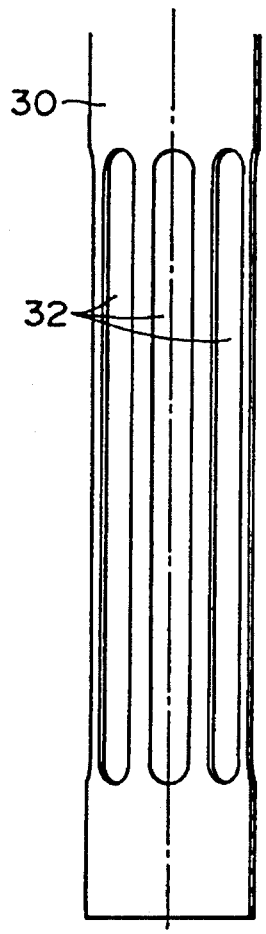
FIG. 3 is a perspective view of a casing, a part of which is omitted, shown in FIG. 2.
Figure 4:
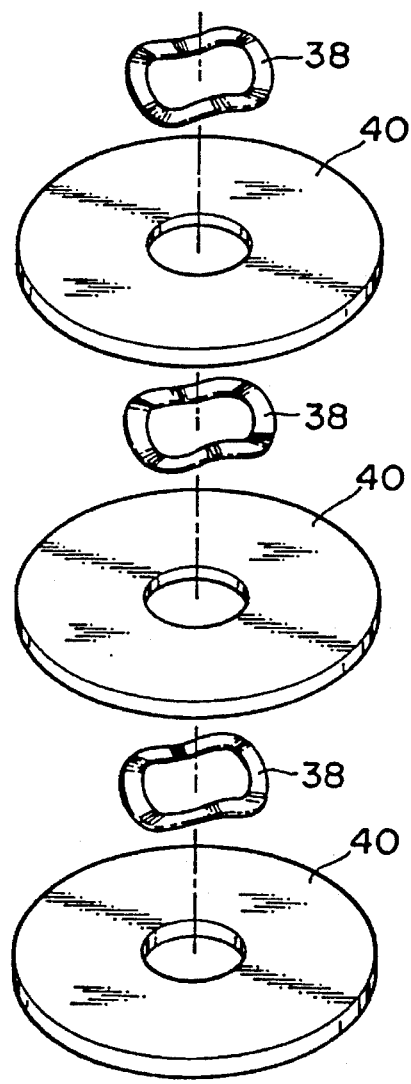
FIG. 4 is an exploded perspective view of wave washers and annular plate members of a laminated structure shown in FIG. 2.

Referring to FIG. 2 which shows more specifically the structure illustrated in FIGS. 1A and 1B, a plurality of axially extending slits 32 are formed as shown in FIG. 3 in the circumferential wall of a lower portion of the cylindrical casing 30. A guide rod 34 is positioned in the central portion of the casing 30 and fixed at the lower end portion thereof, and the lower end of the casing 30 is sealed with an end plug 36. A plurality of wave washers 38, which function as spring members, and a plurality of annular metal plate members 40 are piled up alternately (10–50 pieces in total) on the lower end plug 36 and housed in the casing 30. The details of the laminated condition of these wave washers 38 and annular plate members 40 are shown in FIG. 4. As shown in the drawing, the wave washer 38 is formed by making a thin annular elastic plate wary so that the wave washer uniformly receives an axial load on the circumferential portion thereof, and thus constitutes a mechanical part used effectively as a shock absorber to be inserted in a small space. It is utilized widely as a spring in general which serves also as a spacer. In this embodiment, commercially available wave washers can be used. The axial range of formation of the slits 32 substantially corresponds to the region (in the direction of height) of the casing in which the laminate is housed. The guide rod 34 passes through the central holes in the wave washers 38 and annular plate members 40, and works so as to position the circumferential portions of the wave washers 38 and annular plate members 40 and guide them when they are vertically displaced. A piston 42 is provided on the laminate (FIGS. 2 and 2A). This piston 42 has an O-ring seal 44 therearound, and can be slidably moved in the axial direction in the casing 30.

A hoist gear 46 having a motor (not shown) is provided in the upper end portion of the casing 30. Wires 50 are suspended from the hoist gear 46, and hooks 48 are attached to the lower end portions of the wires 50 are capable of holding and releasing an upper end grip portion 54 of a deadweight 52. When the deadweight 52 is vertically moved, it is guided by a deflection (swing) preventing shaft 58 extending through a bore 56. The deflection preventing shaft 58 is provided on its upper portion with a projection 60 for opening the hooks 48, and a coiled spring 62 for applying a downward resilient force to the deadweight 52 is provided around the shaft 58.

The operation of this apparatus will now be described. The upper end grip portion 54 of the deadweight 52 is grasped by the hooks 48, and the hoist gear 46 is driven to wind up the wires 50. The deadweight 52 is moved up as it is guided by the deflection preventing shaft 58, to shortly reach the lower end portion of the coiled spring 62. When the wire hoisting operation is continued, the deadweight 52 is moved up against a resilient force of the coiled spring 62. When the hooks 48 are still driven upward even after the upper portions thereof have reached the hook-opening projection 60, the lower end portions of the hooks 48 are opened owing to the cam actions of the projection 60 and hooks 48. Consequently, the deadweight 52 is released from the hooks 48 and falls onto the piston 42 due to the resilient force of the coiled spring 62 and the weight of the deadweight itself. Due to the impact force occurring at this time, the laminated wave washers 38 are deformed flat and the laminate contracts axially. During this time, the bore hole water among the annular plate members 40 is discharged outward through the slits 32 to apply a large vibratory force to the bore hole wall.

The results of a preliminary experiment conducted by using a prototype are as follows. A total of sixty wave washers and annular plate members were laminated alternately, and a deadweight of 1.2 Kg was dropped by gravity from a positioned of 1 meter in height onto the laminate. As a result, an occurrence of vibratory (or wave) energy of about 12 J was observed. Moreover, it was proved that the vibration waveform included a large high-frequency component as compared with that of a conventional electro-magnetic hammer type wave source. Such large high frequency component described above represents the possibility of improvement of the resolution (resolving power). The measurement of the inter-bore hole velocity of elastic waves was conducted by using two bore holes spaced from each other by about 3 meters, with this wave source set in a position at a depth of 5 meters in a wave generating bore hole and a wave receiver set in a position at a depth of 35 meters in a wave receiving bore hole. Consequently, it was ascertained that a sufficiently good signal could be detected. Incidentally, even when a conventional electro-magnetic hammer type wave source was used under the same conditions with the gain set to a maximum, a signal could not be detected. When the deadweight in the prototype was dropped forcibly using the force of a spring, wave energy of about 600 J was produced. In view of the results of this preliminary experiment, it is estimated that the inter-bore hole velocity of elastic waves can be measured satisfactorily even when the distance between the bore holes is about fifty to about five hundred meters.

FIG. 2A shows a preferred example of the construction of the piston, designated at 20 in FIGS. 1A and 1B. This structure was developed to be used effectively, especially, when the geological survey such as velocity logging is done in a position of great depth (under the ground), and it is designed so that it works correspondingly to the pressure of the water in the bore hole, which necessarily increases in proportion to the depth of the position at which the velocity logging is carried out under ground. Namely, the pisotn 42 is designed so that a difference in pressure in the space surrounding piston is balanced so as to prevent the variation in the piston-striking efficiency with the depth of at the measuring position. Thus, the same vibratory force can be generated at all times and, consequently, the velocity logging is achieved effectively.

As shown in the drawing, a piston guide plate 30b having a central bore 30a is formed integrally with the casing 30, in which the deadweight 52 is movably provided, to divide the interior of the casing 30 into a deadweight dropping space at an upper position and a piston chamber 30c at a lower position. The piston 42 is provided on the upper side of its base portion 42c with a central projection 42b which can be moved slidingly in the vertical direction in the central bore 30a via a desired packing, and on the lower side of the base portion 42c with a plurality of equidistantly and circularly arranged rod type legs 42a which project downward. The legs 42a have a diameter smaller than the outer diameter of the base portion 42c, so that the deadweight 52 in the deadweight dropping space falls onto the central projection 42b. The legs 42a of the piston 42 extend below an annular projection 30d of the casing 30, and keep in contact with the uppermost portion of the laminate of annular plate members 40 and wave washers 38. When the deadweight 52 falls onto the piston 42, the rod type legs 42a apply an impact force to the laminate (38, 40) to cause the necessary vibration to occur. Since the pressure in the space (on the inner, outer, upper and lower sides of the piston) surrounding the piston 42 is balanced during this time, variation of a piston-striking efficiency with the depth of a velocity logging position does not occur, so that a constantly equal vibratory force can be generated. Therefore, the generation of vibrations (waves) and the velocity logging operation can be carried out suitably.

In the space surrounding the piston 42, the air sealed therein when the wave source was inserted in a bore hole exists in a compressed state. Since this air has a compressibility, the movement of the piston 42 is not restricted when it is struck by the deadweight.

Figure 5:
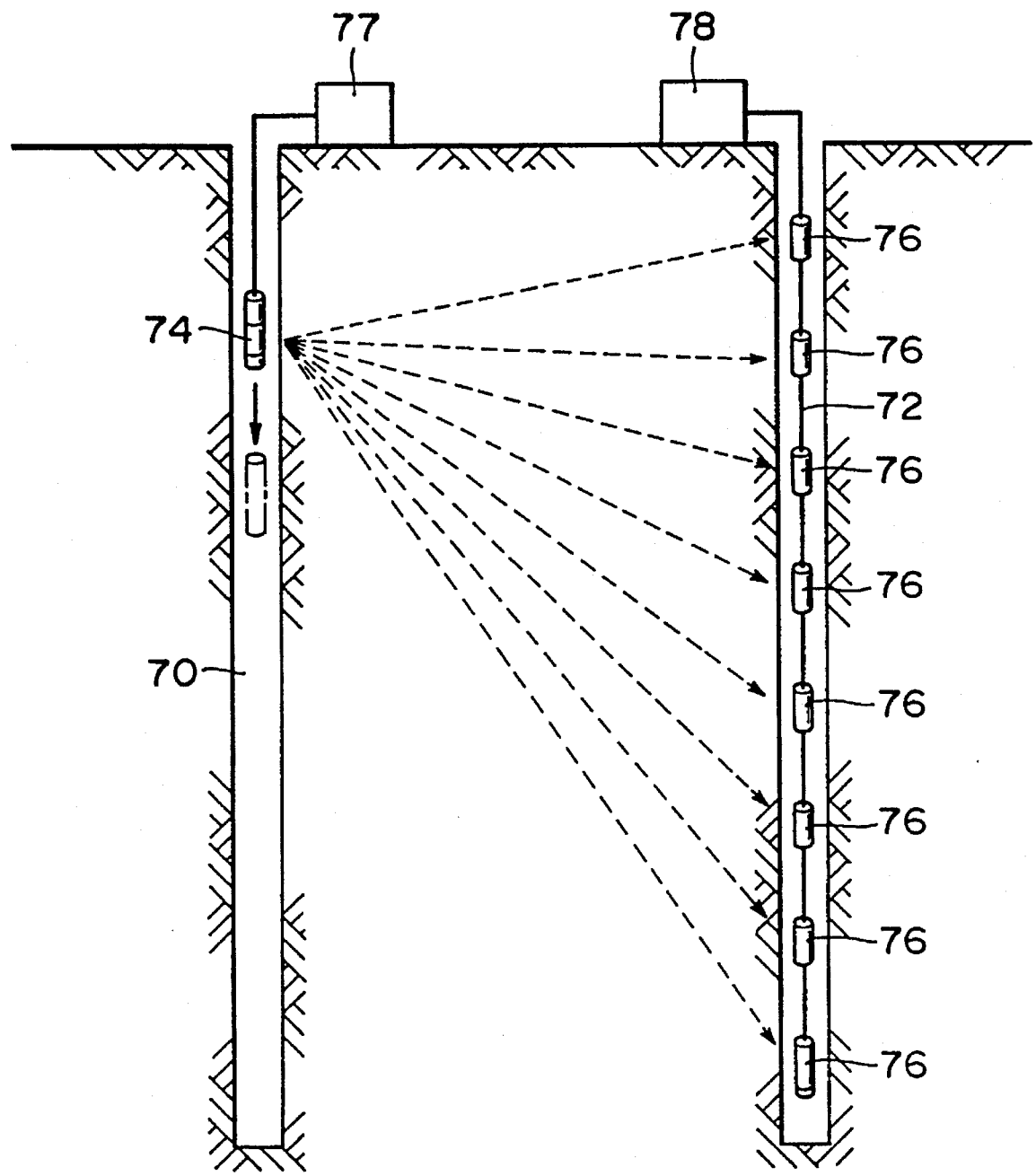
FIG. 5 illustrates an example of use of the wave source according to the present invention.

FIG. 5 illustrates tomography which shows the technique for measuring the velocity of elastic waves travelling between two bore holes, and three-dimensionally expressing (tomographically imaging) the vibration characteristics over a wide range of underground. A bore hole wave source 74 according to the present invention is inserted in a wave generating bore hole represented at 70, and multiple-connected wave receivers 76 are inserted in a wave receiving bore hole represented at 72. When a wave is generated as the operation of the bore hole wave source 74 as controlled by a wave control unit 77 on the ground, the elastic waves propagate as shown by broken lines, to reach the wave receivers 76. The signals from wave receivers 76 are recorded in a reception wave measuring instrument 78. Waves are generated as the position (depth) of the wave source in the wave generating bore hole 70 is changed sequentially, and the elastic waves are observed in the wave receiving bore hole 72. The wave generating bore hole and the wave receiving bore hole are then used conversely, and similar a measurment is conducted. The vibration (wave) characteristics of the ground are analyzed three-dimensionally by subjecting the results of this observation to computer-processing. When the wave source according to the present invention is used, the elastic waves reach an object position even if the distance between the bore holes is around fifty to five hundred meters as described above. Therefore, the vibration characteristics over a wide range of ground can be determined by using a small number of bore holes.

Figure 6A:
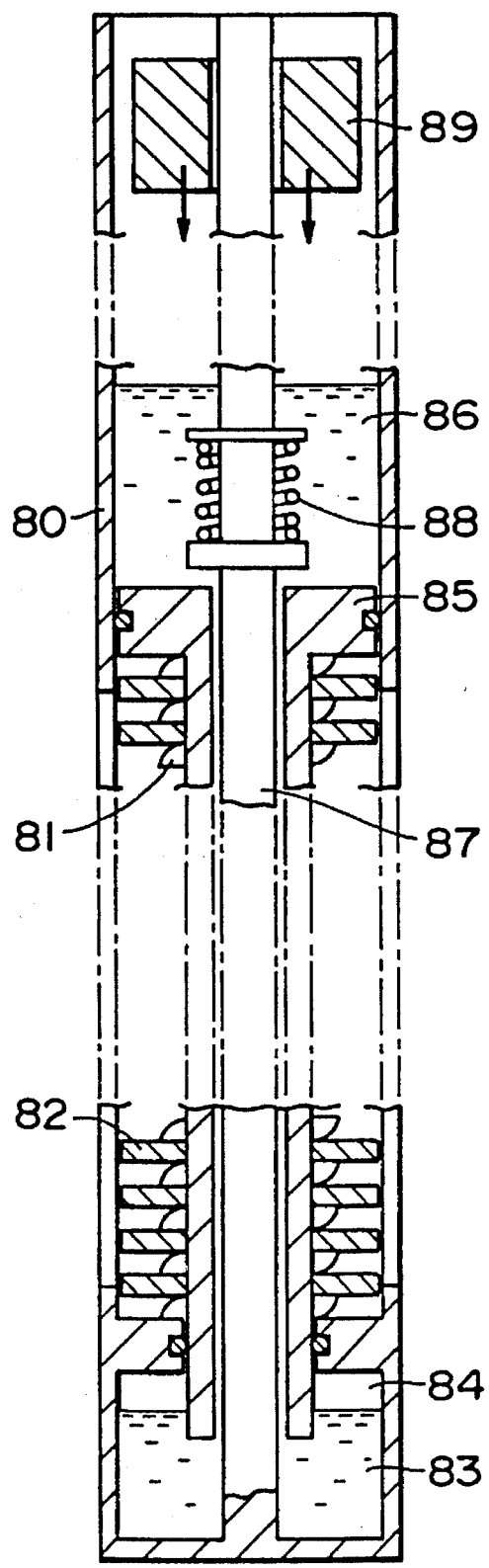
FIGS. 6A and 6B are partially cut away side elevations of the wave source according to two forms of a second embodiment of the present invention.
Figure 6B:
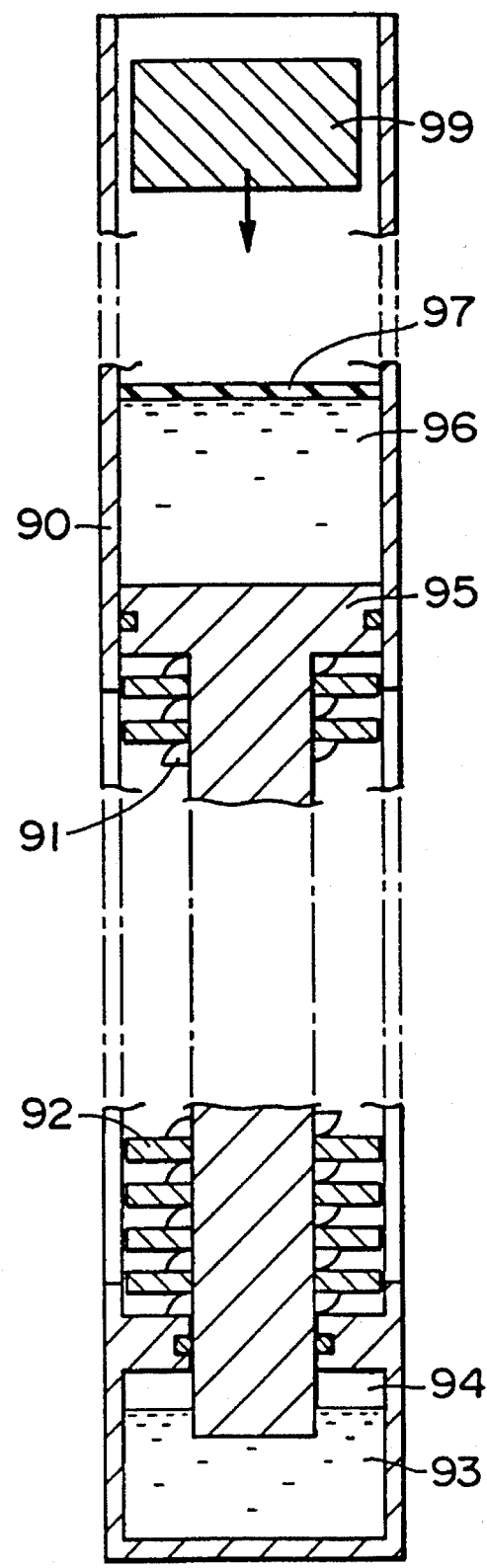

FIGS. 6A and 6B are construction diagrams of other embodiments of the present invention. In these embodiments, a liquid reservoir is provided on the upper side of a piston member 85, 95, and a drop impact force of a deadweight 89, 99 is transmitted to the piston member 85, 95 via the liquid. Owing to this construction, the deadweight 89, 99 does not collide directly with the piston member 85, 95, and the deformation of the piston member 85, 95 is prevented so that the sliding movement of the piston member 85, 95 in the casing 80, 90 is not adversely affected. A laminate of wave washers and annular plate members is placed in a casing having slits in the same manner as in the previous embodiments.

In the structure of FIG. 6A, a laminate of a plurality of wave washers 81 and annular plate members 82 is housed in a casing 80, and a lower liquid reservoir 83 and a gas chamber 84 are provided in the lower end portion of the casing 80, an upper liquid reservoir 86 being provided on the upper side of a piston member 85. A guide rod 87 is provided so as to extend through the central portion of the piston member 85, and a spring 88 is provided on a flange portion of the guide rod so as to receive the deadweight 89. The falling deadweight 89 impacts on a liquid (for example, water) in the upper liquid reservoir 86. Since this liquid is incompressible, the drop impact force of the deadweight 89 is transmitted to the piston member 85 via the liquid to cause the piston member 85 to lower. Consequently, the wave washers 81 are deformed flat, and the bore hole water in the laminate is discharged to the outside to generate elastic waves in the bore hole wall. The operation described above of this embodiment is identical with that of the previously-described embodiment. The drop impact force of the falling deadweight 89 is received by the guide rod 87 and casing 80. As the deadweight 89 drops further, it is received by the spring 88 so that the deadweight 89 does not collide with the piston member 85. A gas (for example, air) in the gas chamber 84, which has a compressibility, functions to offset the lowering of the piston member 85.

In the modification shown in FIG. 6B, a laminate of a plurality of wave washers 91 and annular plate members 92 is housed in a casing 90, and a lower liquid reservoir 93 and a gas chamber 94 are provided in the lower end portion of the casing 90, an upper liquid reservoir 96 being provided on the upper side of the piston member 95. The upper surface of a liquid in the upper liquid reservoir 96 is covered with a rubber film 97 so that the deadweight 99 is received thereon. The falling deadweight 99 impacts a liquid (for example, water) in the upper liquid reservoir 96 via the rubber film 97. The drop impact force of the deadweight 99 is transmitted to the piston member 95 to cause the same to lower, the wave washers 81 are deformed flat, and the bore hole water in the laminate is discharged to the outside.

Figure 7A:
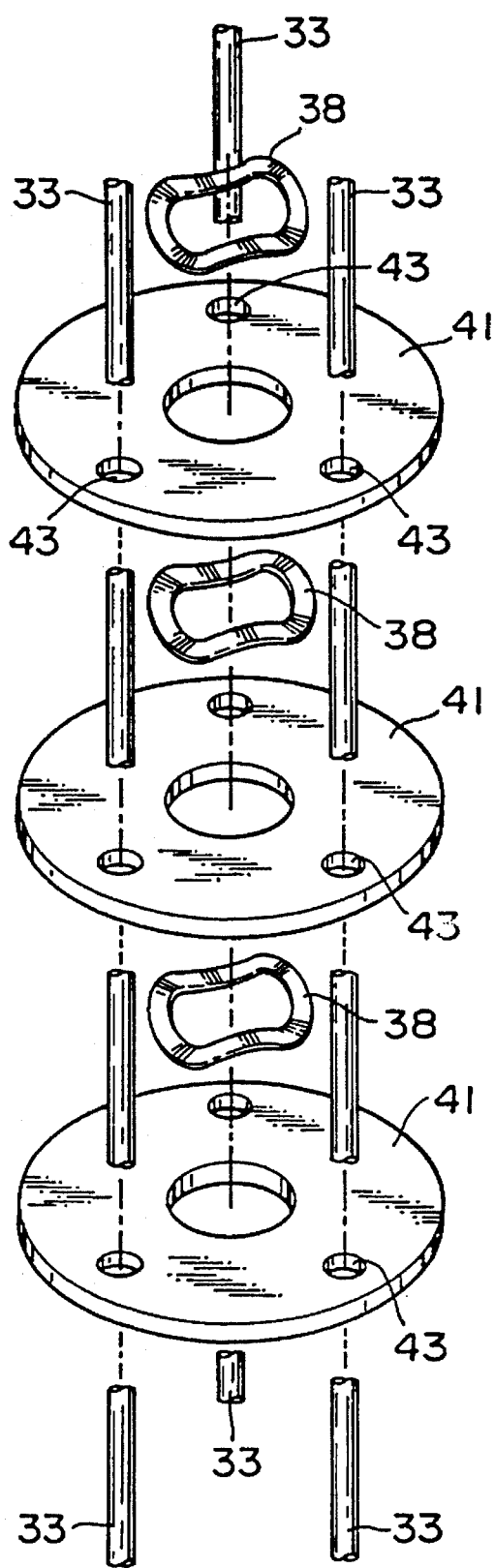
FIGS. 7A and 7B are perspective views showing the construction of a laminate in a third embodiment of the bore hole wave source according to the present invention.
Figure 7B:
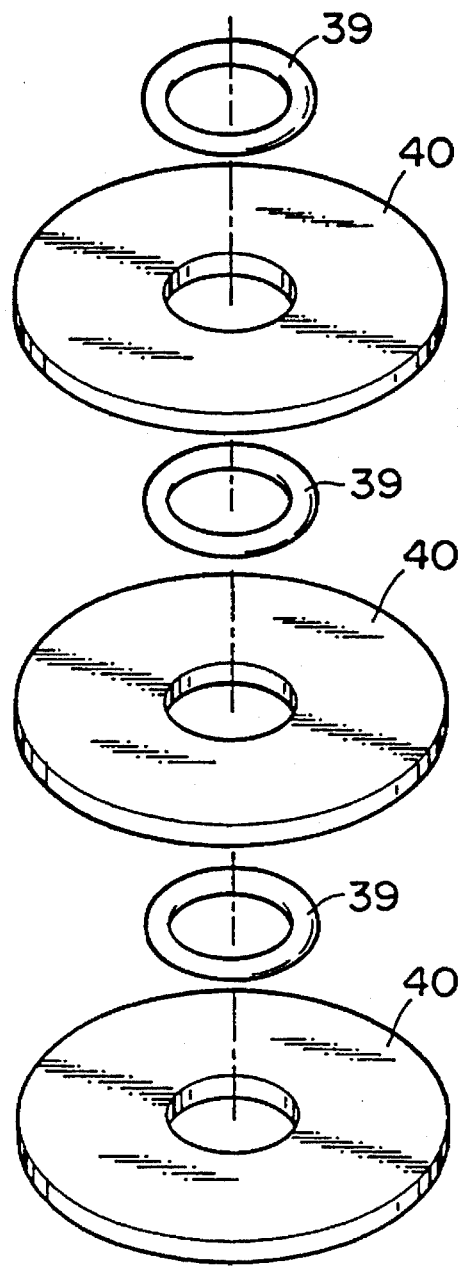

FIGS. 7A and 7B show another example (in a third embodiment) of the construction of the laminate used in the wave source according to the present invention and a modified example thereof. In the example of FIG. 7A, a plurality of (three in the illustrated example) holes 43 are made in the circumferential portion of each annular plate member 41 instead of employing an opening-carrying casing, and guide rods 35 having a diameter which is far smaller than that of these holes 45 are inserted through the holes 43. Owing to this construction, the annular plate members 41 are retained so that the movements thereof in their planes are restricted.

Besides this example, rings 39 of a rubber-like material can be used instead of wave washers as shown in FIG. 7B. These rings 39 may be cross-sectionally circular as O-rings, or cross-sectionally rectangular as rubber bushings. Any materials can be used as long as they can contract upon impact of a deadweight dropped thereon, and thereafter restore their original shapes. Since the height of such rings 39 is constant over the whole circumference thereof, an opening-carrying casing and guide rods, which are employed in the case where wave washers are used, can be omitted. Even when simple annular plate members 40 having no small holes in the circumferential portions thereof and only a guide rod (represented by reference numeral 34 in FIG. 2) inserted through central portions of the members 40 are used, a desired laminated condition of the rings and plate members can be maintained.

Suitable resilient parts, such as leaf springs instead of the above-described wave washers and rubber rings can be employed as the resilient members. The shape and positions of the openings formed in the circumferential wall of the casing may be changed suitably in accordance with the directivity of vibration (elastic waves) to be generated. Whether or not the guide rod is provided and the shapes of the guide rod and piston member can also be selected suitably in accordance with the construction of the apparatus. Also, the deadweight gripping and releasing mechanism, deadweight hoisting, retaining and releasing mechanism and spring mechanism for applying a downward resilient force to the deadweight can be replaced by other suitable parts as necessary.

In these embodiments, a plurality of plate members and resilient members are laminated alternately, and a deadweight is dropped so as to collide with the laminate, so that the resilient members are deformed to discharge the bore hole water among the plate members to the outer side and generate elastic waves in the bore hole wall, and the weight of the deadweight is set to increase the falling speed thereof and generate a suitable level of waves. Accordingly, the drop energy can be increased by increasing the weight of the deadweight and a drop distance and by driving the deadweight by a spring. As a result, a large vibratory force can be generated even when the diameter of an opening of the casing is small. Since the wave contains a large high-frequency component, the resolution (resolving power) is improved. Therefore, when the inter-bore hole velocity of elastic waves is measured, the wave characteristics of a wide range of ground formations can be determined accurately by using only a small number of bore holes. Since an explosive is not used, the wave source can be used safely and easily, so that there is not the possibility that the bore hole wall will be broken. Therefore, the wave source according to the present invention is used optimally for the tomographic techniques.

In the deadweight dropping type bore hole wave source for an S wave (shear wave) which achieves one of the objects of the present invention, a deadweight dropping type mechanism is provided as shown in FIGS. 8A and 8B which schematically show the construction thereof. In this mechanism, a laminate 18 is formed by alternately laminating plate members 16 and resilient members 14, and pivotal fulcrum members 11 are inserted among the plate members 16 so that the fulcrum members 11 extending in the same direction. A deadweight 22 is dropped onto the laminate 18 so that the upper portion of one side part, which is opposed to the other side part with respect to the fulcrum of the laminate 18, is forcibly struck.

The pivotal fulcrum members 11 have a cross sectionally circular or triangular body (wedge-shaped body), and are extended in the diametrical direction of the plate members 16. These pivotal fulcrum members 11 serve also as spacers for the plate members 16, and the plate members 16 are supported at regular intervals (with a pitch corresponding to the diameter of a pivotal fulcrum member 11) and horizontally (in parallel with one another) on the resilient members 14.

The deadweight dropping mechanism is composed, for example, of a deadweight, a deadweight hoisting, retaining and releasing mechanism, and a spring mechanism for applying a downward resilient force to the deadweight. Two deadweight dropping mechanisms are provided above the laminate. The deadweight dropping mechanisms may also consist of a deadweight having a projection on one side portion of the lower surface thereof, a mechanism for half-turning, retaining and releasing the deadweight, and a spring mechanism for applying a downward resilient force to the deadweight. In this case, only one deadweight dropping mechanism may be provided. In these structures, a system utilizing gravity as a self-drop force of the deadweight may be employed. In a preferred embodiment, a spring mechanism for applying a downward resilient force to the deadweight is incorporated as described above to forcibly drop the deadweight, so that a wave generating force is increased.

A laminate 18 may be housed in the lower portion of the interior of a casing 10 having openings 12 in the circumferential wall thereof so that a deadweight dropping mechanism is provided above the laminate. The openings 12 can be formed in the portion of the circumferential wall of the cylindrical casing 10 which is in the vicinity of the laminate, so as to extend, for example, narrowly in the axial direction. Another structure may also be employed in which position restricting shafts are inserted through holes made in the circumferential portions of the plate members without providing the wall of a cylindrical casing at the portion which is in the vicinity of the laminate. When rubber rings are used, a laminate may be retained by a central guide rod only.

In the structure shown in FIG. 8A, the plate members 16 are supported horizontally on the pivotal fulcrum members 11 and resilient members 14. The spaces among the plate members 16 are filled with bore hole water. When the deadweight 22 drops onto the laminate in this condition, the resilient members 14 are deformed suddenly due to the impact force thereof as shown in FIG. 8B. At this time, the height of the central portion of the laminate 18 consisting of plate members 16 and resilient members 14 does not change because the pivotal fulcrum members 11 are interposed as spacers between the plate members, and the distance between the portions of the plate members which are on the deadweight-struck side (right side in the embodiment of FIG. 8B) is reduced against the resilient force of the resilient members 14, whereas the distance between the portions of the plate member on the non-deadweight-struck side is conversely increased correspondingly. Since this phenomenon occurs in the water, the water among the portions of the plate members of the reduced distance is forced out suddenly as shown by hollowed or white arrows, while the bore hole water flows from the outside into the spaces among the distance-increased portions of the plate members. The impact of the water causes elastic waves (S waves in this case) to occur in the bore hole wall.

When the pivotal fulcrum members 11 are provided so as to extend in the diametrical direction of the annular plate members 16, the flow rate of the water flowing out from the spaces in the laminate and that of the water flowing thereinto become equal, so that the overall volume of the water in the wave source is not varied. Accordingly, this apparatus constitutes an ideal dipole wave source. When a deadweight 22 is formed so that it is urged downward by the force of a spring, this force is added to the self-dropping force of the deadweight. Consequently, the impact force imparted to the upper surface of the laminate further increases, and a wave generating force becomes large, so that this structure is preferred.

Figure 9:
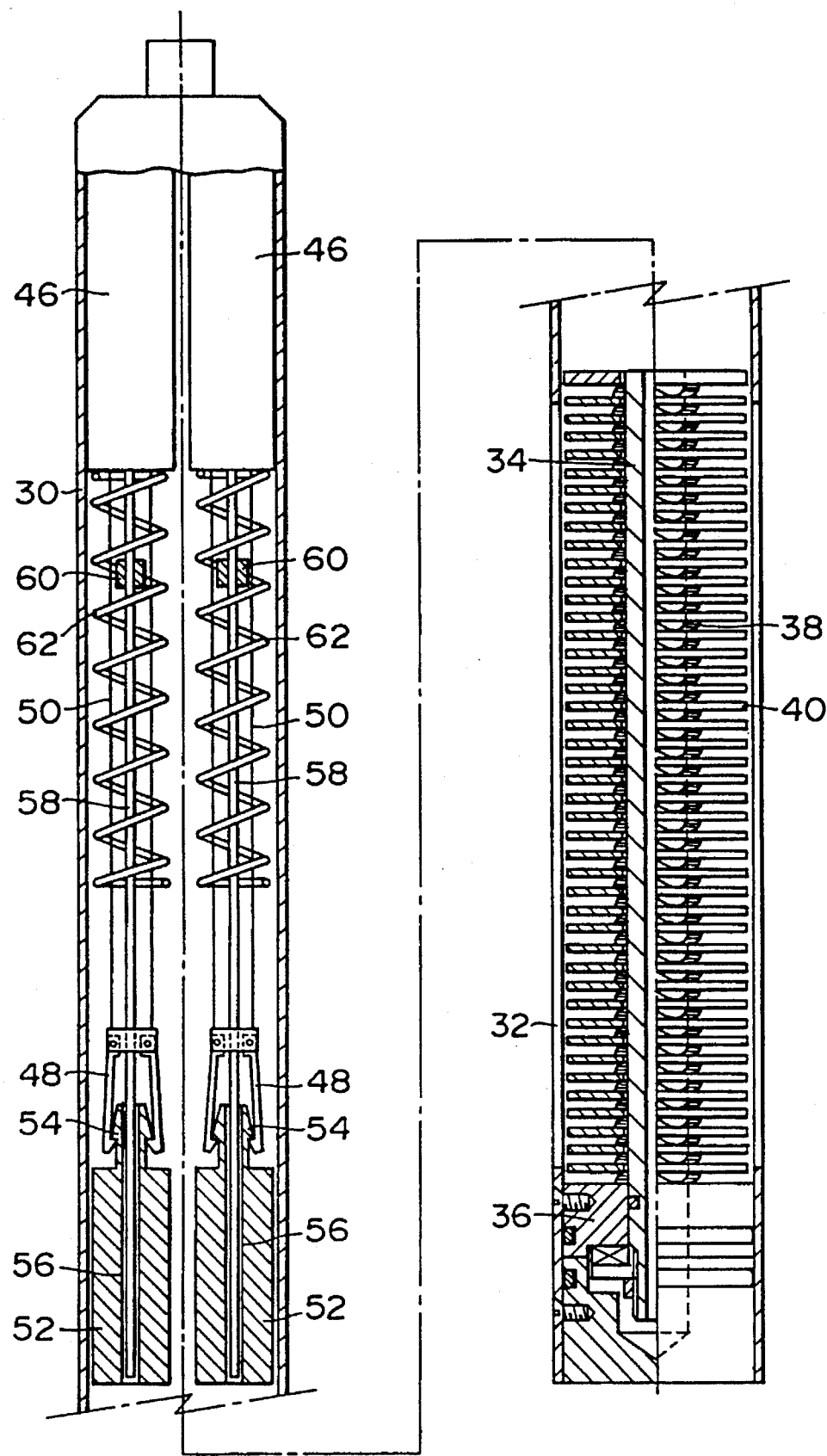
FIG. 9 is a partially sectioned side elevation showing a specific construction of the embodiment of FIGS. 8A and 8B.

Referring to FIG. 9 which shows a more specific construction according to the embodiment of FIGS. 8A and 8B of the present invention, large axially extending openings 32 are formed at opposite sides of a lower portion of a casing 30. In the lower central portion of the casing 30, a guide rod 34 is positioned, and the lower end portion of the guide rod is fixed to a lower end plug 36 for the casing 30. A plurality of (about 10–50) wave washers 38 functioning as resilient members and having a resiliency and annular metal plate members 40 are housed in an alternately laminated state on the lower end plug 36 in the casing 30. Among all of the annular plate members 40, columnar pivotal fulcrum members (shown at 11 in FIGS. 8A and 8B, and at 42 in FIG. 10) are interposed. The axial range of formation of the opening 32 substantially corresponds to the position (height) of installation of the laminate. The guide rod 34 extends through the central holes of the wave washers 38 and annular plate members 40, and functions to approximately position the wave washers and annular plates in the same manner as in the previous embodiments.

Figure 10:
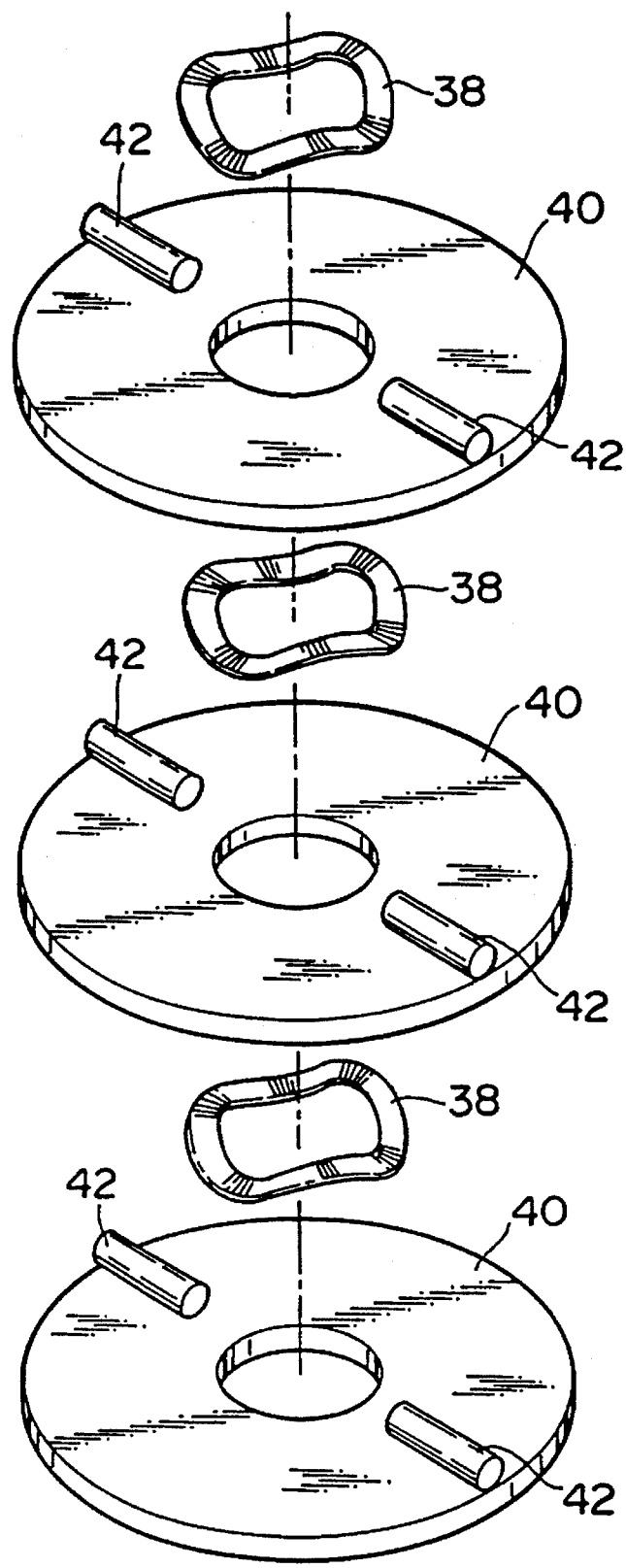
FIG. 10 is an exploded perspective view of wave washers, annular plate members and fulcrum members in a laminated condition.

Referring to FIG. 10, the pivotal fulcrum members 42 are arranged so that all of them extend in the same direction and are fixed by welding to two diametrically opposite portions of one surface of each of the annular plate members 40. These pivotal fulcrum members 42 may have cross-sectionally triangular shapes (wedge-shaped) instead of cross-sectionally circular shapes. The wave washers 38 consists of thin annular resilient waved plate members as shown in the drawing, and are utilized widely as spacer type springs in general. The washers 38 shown and used in this embodiment are commercially available.

Referring back to FIG. 9, two deadweight dropping mechanisms are provided side by side in the upper end portion of the casing 30. These deadweight dropping mechanisms are identical with that in the embodiment of FIG. 2, and have motor-carrying hoist gears 46. Hooks 48 which can be opened and closed are fixed to wires 50. The wires 50 are suspended from the hoist gears 46, and these hooks 48 are formed so that they can grasp and release the upper grip portions 54 of a deadweight 52. The deadweight 52 is guided during the vertical movements thereof by a deflection preventing shaft 58 extending through a vertical through bore 56 in the central portion of the deadweight 52 to prevent a deflection or swinging movement. The shaft 58 is provided at the upper portion thereof with a hook releasing projection 60, and at the circumferential portion thereof with a coiled spring 62 for applying a downward resilient force to the deadweight, and the arrangement described above is also identical with the corresponding arrangement in the embodiment of FIG. 2.

The operation of the apparatus in the embodiment of FIG. 9 will be explained, though it is almost identical with that of the embodiment described with reference to FIG. 2.

Either one of the deadweight dropping mechanisms is selectively driven. The upper end dropping portion 54 of the deadweight 52 is grasped by the hooks 48, and the hoist gear 46 is driven to wind up the wires 50. The deadweight 52 moves up as it is guided by the deflection preventing shaft 58, and shortly reaches the lower end portion of the coiled spring 62. When the wire lifting operation is continued, the deadweight 52 is moved up against a resilient force of the coiled spring 62. When the deadweight 52 is still urged upward even after the upper end portions of the hooks 48 have reached the hook-opening projection 60, the lower end portions of the hooks 48 are opened by the cam action of the projection 60 and hooks 48. Consequently, the deadweight 52 is released from the hooks 48 and falls onto one side portion of the laminate by the resilient force of the coiled spring 62 and the weight of itself, so that the laminated wave washers 38 are deformed due to the impact force. During this time, the height of the central portion of the laminate does not vary because the pivotal fulcrum members 14 are interposed among the members thereof as a whole. However, the distances to and from the portions of the annular plate members 40 on the deadweight-struck side are reduced, and the portions of the same plate members 10 on the opposite side are inclined to increase the distances. Consequently, the bore hole water in the spaces among the annular plate members 40 is discharged suddenly from the distance-reduced side thereof to the outer side through the openings, while the bore hole water flows suddenly from the outer side into the spaces among the distance-increased portions of the plate members. Owing to the impact of the water on the wall of the bore hole, a large vibratory force is applied thereto.

FIGS. 11A, 11B and 12A–12C show modified examples of the construction of the embodiment of FIG. 9. In this modified example, only one deadweight and hoist gear set is provided so that it can meet the purpose by providing a deadweight with projection on one side portion of the lower surface thereof, and a mechanism for half-turning, retaining and releasing the deadweight. A deadweight lifting, retaining and releasing mechanism and a spring mechanism may be provided which is identical with those in the previous embodiments.

Figure 11A:
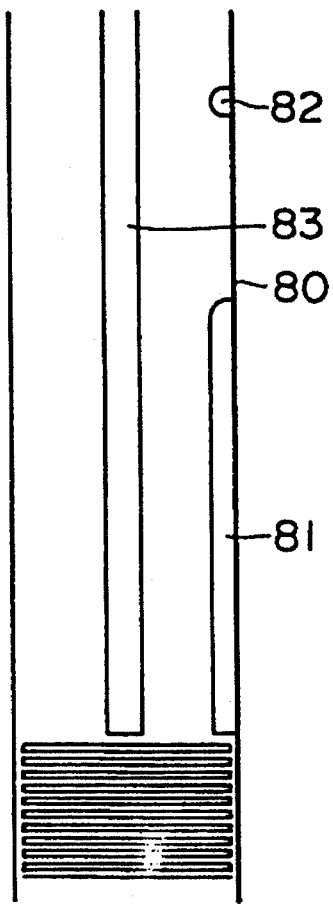
FIGS. 11A and 11B show an example of the construction of a casing in the embodiment of FIG. 9, FIGS. 12A, 12B and 12C illustrate the consruction of a deadweight.
Figure 12A:
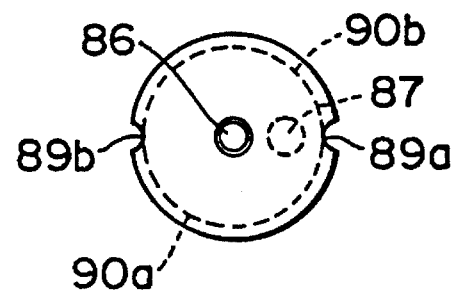
Figure 12B:
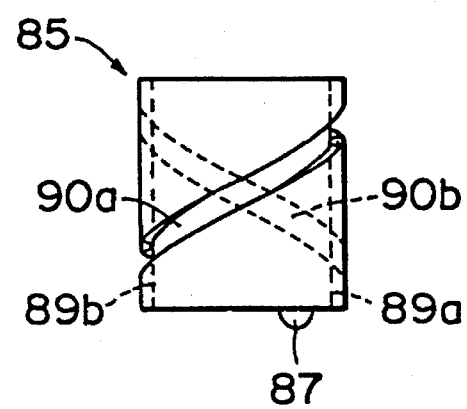
Figure 11B:
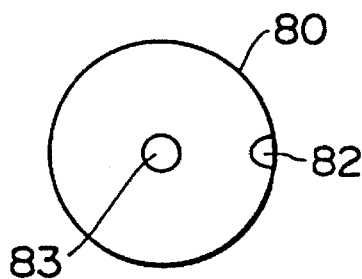
Figure 12C:
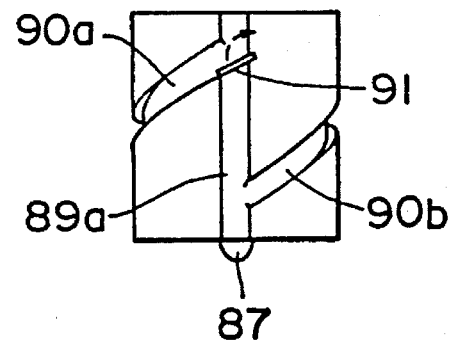

As shown in FIGS. 11A and 11B, a casing 80 is provided with one axially extending guide projection 81 on a portion of the inner surface thereof which is somewhat higher than the laminate-inserted portion thereof, and with a deadweight half-turning projection 82 on a portion of the same inner surface for half-turning the deadweight. The projection 82 is provided upwardly and away from the upper end of the guide projection 81 by a distance somewhat smaller than the height of the deadweight. A guide shaft 83 for moving the deadweight is suspended in the central portion of the interior of the casing 80. As shown in FIGS. 12A, 12B and 12C, the deadweight has a columnar body and a vertical through bore 86 in the central portion thereof through which the guide shaft 83 is inserted, and a projection 87 is provided on one side portion of the lower surface of the deadweight 85. The deadweight 85 further has vertical grooves 89a, 89b at 180°-spaced symmetric portions of the outer circumferential surface thereof, and helical grooves 90a, 90b half-turning in the same direction between the two vertical grooves 89a, 89b. In addition, a change-over device 91, such as a check valve, for opening and closing the grooves is provided in the upper portion of the deadweight at which the vertical grooves 89a, 89b and helical grooves 90a, 90b cross each other, as shown in FIG. 12C.

The operation of this deadweight dropping mechanism will now be described with reference to FIGS. 13A–13C.

First, assume that the guide projection 81 is fitted in one vertical grooves 89a in the deadweight 85 as shown in FIG. 13A. At this time, the projection 87 on the lower surface of the deadweight 85 is positioned at the right side portion of the drawing. When the deadweight 85 is then lifted, it moves up without being turned, and the upper portion thereof reaches a position near the projection 82 (FIG. 13B). When the deadweight is further lifted, the projection 82 is guided from the vertical groove 89a to the helical groove 90a by an operation of the change-over device 91 (FIG. 12C) to cause the deadweight 85 to be half-turned as shown in FIG. 13C until it has attained the condition of FIG. 13D. Consequently, the projection 87 on the lower surface of the deadweight 85 is moved to the left side portion of the same drawing. When the deadweight 85 is then released, it drops to cause the other vertical groove 89b to be fitted over the guide projection 81, so that the left side portion of the laminate can be struck. Namely, when the deadweight 85 is lifted and dropped plural times, an impact force can be applied to the right and left side portions of the laminate alternately.

As described above, in the embodiment of the present invention shown in FIG. 9, a plurality of plate members and resilient members are laminated alternately, and pivotal fulcrum members are inserted among the plate members so that the fulcrum members extend in the same direction, to form a laminate so that the upper portion of one of two side parts, which are opposed to each other via pivotal fulcrum members, of the laminate is forcibly struck by the deadweight. Therefore, the distances among the portions of the plate members on the deadweight-struck side are reduced, while the distances among the portions of the plate members on the opposite side increase. Consequently, the water in the spaces among the distance-reduced portions of the plate members is forced out suddenly to the outer side, and the water flows suddenly from the outer side into the spaces among the distance-increased portions of the plate members, so that elastic waves (S waves) can be generated in the wall of the bore hole.

Figure 14A:
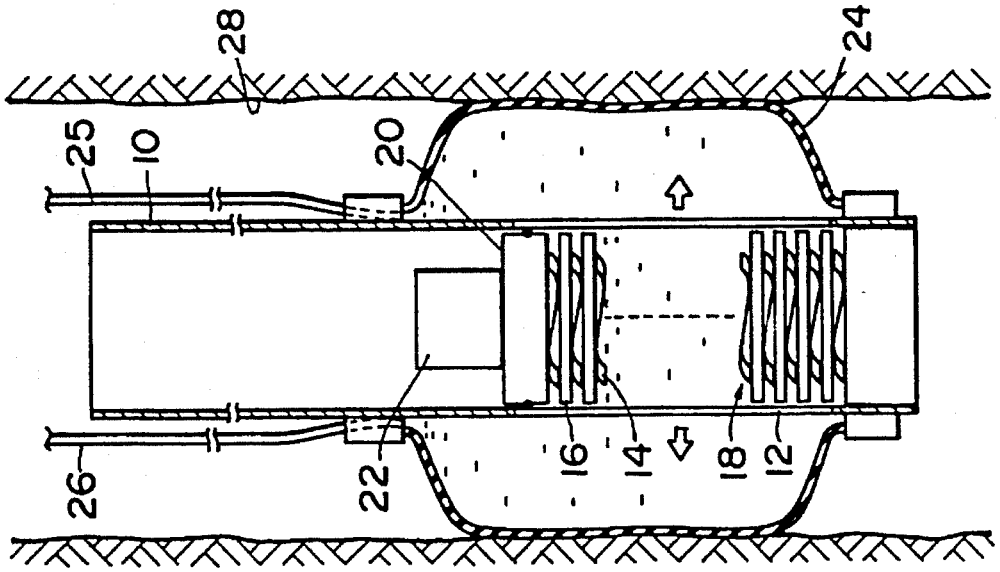
Figure 14B:
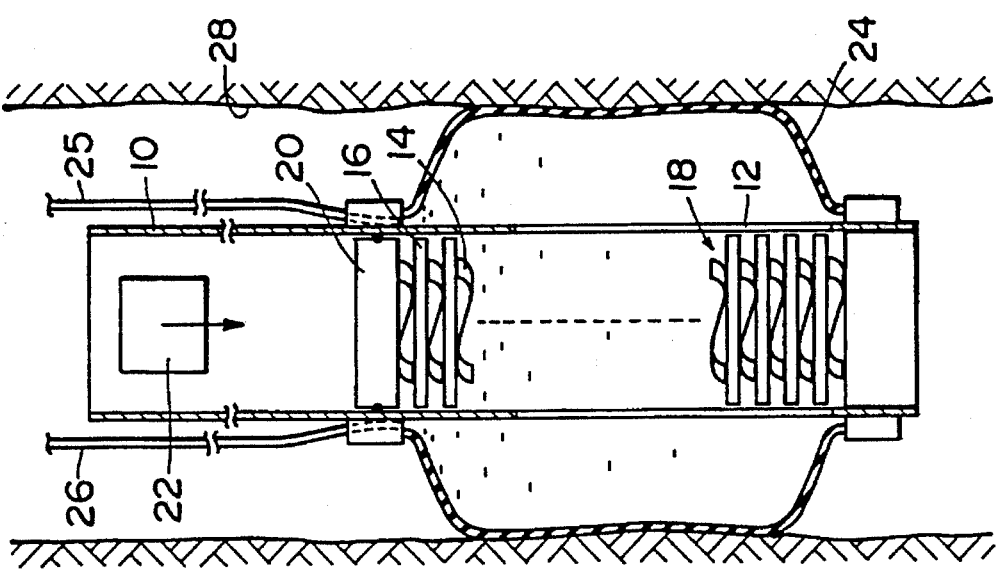
Figure 14C:
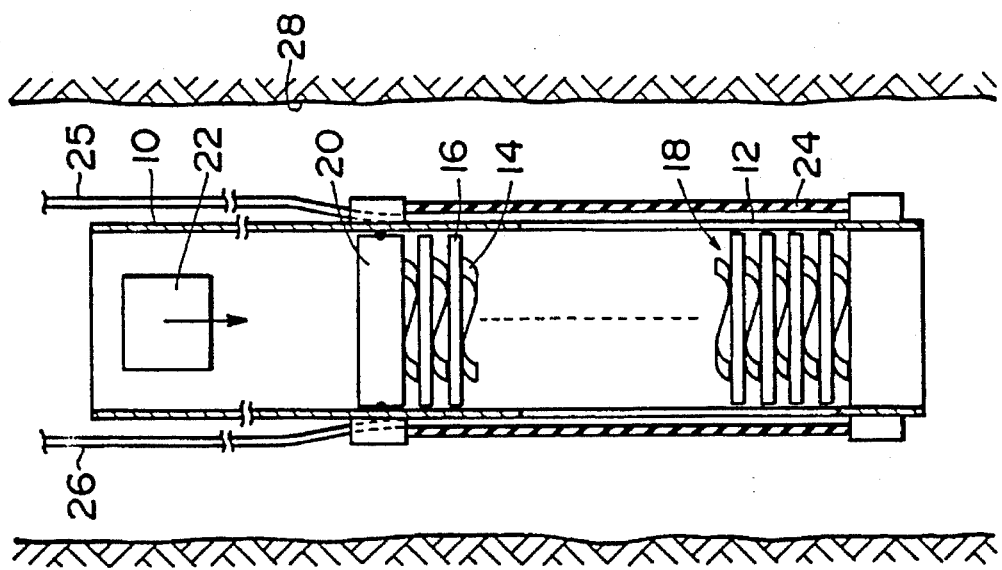

FIGS. 14A–14C show a further embodiment of the present invention, which is effectively used for carrying out a velocity logging operation in a bore hole with no water therein.

The construction of the wave source in this embodiment may be considered identical with that of the previous embodiments, especially the embodiment of FIG. 2 except that the embodiment of FIGS. 14A–14C has a rubber tube 24 as a cover fixed to a cylindrical casing 10 so as to surround a laminate 18, a water injection pipe 25 for filling the rubber tube 24 with water from a position on the ground, and a gas discharge pipe 26.

The use and operation of the wave source in this embodiment will now be briefly described. As shown in FIG. 4A, a wave source is inserted in a bore hole. The bore hole may not have water therein just as is often the case with bore holes of an extremely small depth. After this wave is lowered to a predetermined position, water is supplied from the ground surface to the interior of the rubber tube 24 through the water injection pipe 25, and the air in the rubber tube 24 is discharged at the same time from the gas discharge pipe 26. The water is supplied continuously until the rubber tube 24 is closely contacted with a bore hole wall 28 (FIG. 14B). When a deadweight 22 is dropped onto the piston member 20 with the rubber tube 24 in an expanded state, the resilient members 14 are deformed suddenly due to the impact force, and the laminate 18 consisting of the resilient members 16, 14 and plate members contacts axially (FIG. 14C). As a result, the water in the spaces among the plate members 16 is forced out in the outward direction as shown by hollow arrows to generate elastic waves in the bore hole wall 28 via the water in the rubber tube 24 and the rubber tube 24 itself. Since the rubber is incompressible with the water, the rubber tube 24 does not cause any trouble in particular. Thus, the waves can be transmitted to the bore hole wall 28 with a high efficiency in spite of the absence of bore hole water.

Figure 15:
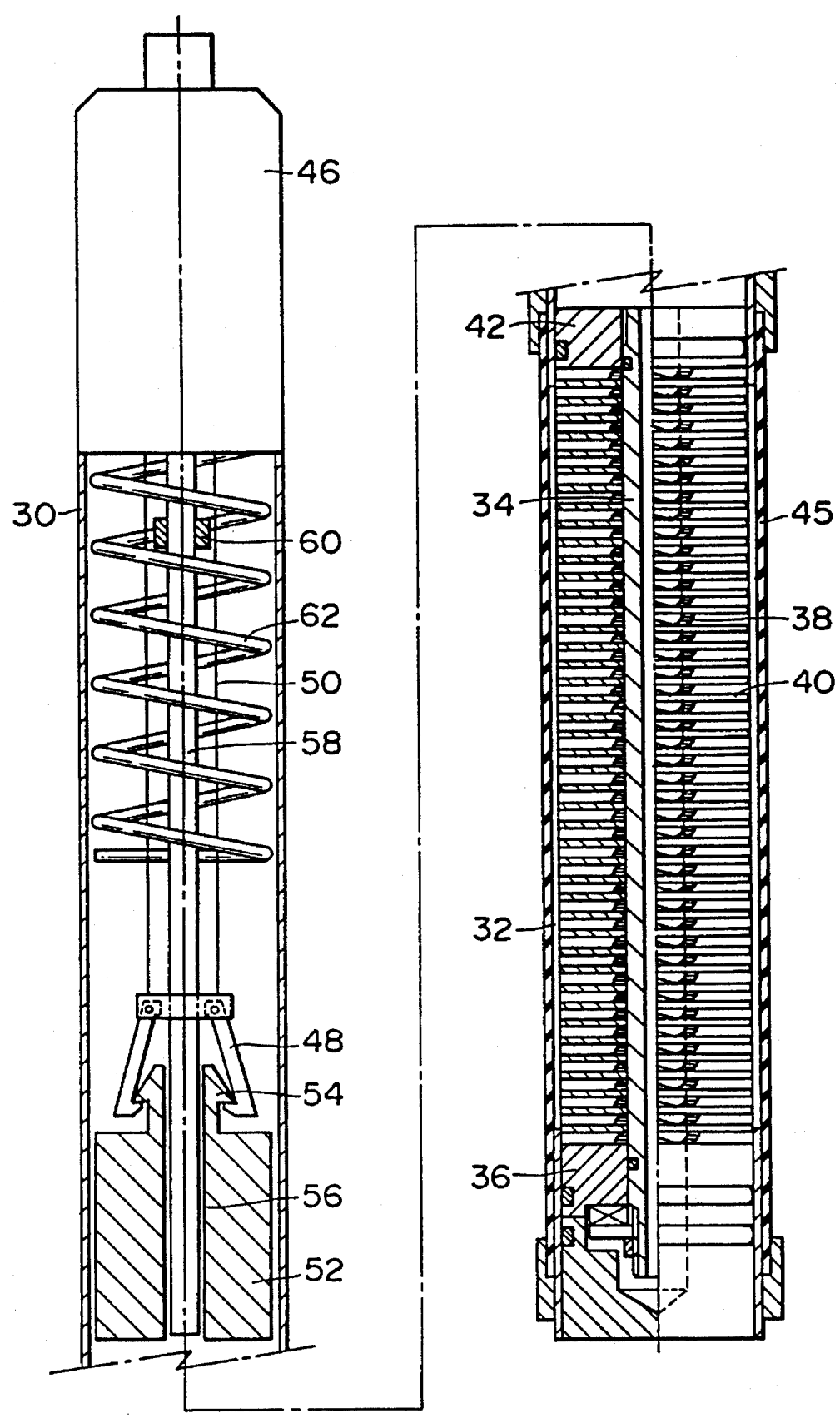
FIG. 15 is an elevation illustrating more specific construction of the structure shown in FIGS. 14A–14C and the operations thereof.

Referring to FIG. 15 showing a specific structure of the wave source for non-water-holding bore holes, a plurality of axial slits 32 are formed in the lower portion of the circumferential wall of a casing 30 in the same manner as in the embodiment of FIG. 2, and, in addition, a rubber tube 45 is provided so as to cover these slits 52 with both end portions thereof fixed to the casing 30. Since the construction of the remaining parts is identical with that of the corresponding parts of the embodiment of FIG. 2, a detailed description thereof is omitted.

FIGS. 16A and 16B show a modified structure of the wave source for non-water-holding bore holes. This structure constitutes a wave source for S waves, in which resilient members 14 and plate members 16 are laminated alternately with pivotal fulcrum members 77 interposed among the plate members 16 so that the fulcrum members 77 extend in the same direction, to form a laminate. This wave source has a deadweight dropping mechanism adapted to forcibly strike the upper side of two side portions, which are opposed to each other via the fulcrum members, of the laminate with a deadweight dropped thereonto. The wave source has a rubber tube 24 which serves as a cover to surround the laminate, an injection pipe 25 for filling the rubber tube 24 with water from the ground surface, and a gas discharge pipe 26, in the same manner as the previous embodiments.

This wave source for non-water-holding bore holes is inserted in a bore hole, and the rubber tube 24 is filled with water so that the rubber tube 24 closely contacts the bore hole wall 28, by injecting water from the ground surface into the rubber tube 24 through the water injection pipe 25 and discharging the air in the rubber tube 24 from the gas discharge pipe 26 (FIG. 16A). During this time, the plate members 16 are supported horizontally by the pivotal fulcrum members 17 and resilient members 14. When the deadweight 22 is then dropped from the upper side, the resilient members 14 are deformed suddenly by the impact force of the former as shown in FIG. 16B. At this time, the height of the central portion of the laminate consisting of the plate members 16 and resilient members 14 does not vary because the pivotal fulcrum members 77 are interposed among the plate members and function as spacers. The distances among the portions of the plate members 16 on the deadweight-struck side (right side portion of FIG. 16B) are reduced against the resilient force of the resilient members 14, and conversely the distances among the portions of the plate members 16 on the non-deadweight-struck side increase a corresponding amount. Since this phenomenon occurs in the water, the water among the portions of the plate members of the reduced distances is forced out suddenly as shown by white arrows in FIG. 16B, while the water flows suddenly into the spaces among the distance-increased portions of the plate members. The impact force of the water causes elastic waves (S waves) to occur in the bore hole wall.

The rubber tube 24 serving as a cover may be formed of a material which is not expansible itself. It may be formed in a folded state in the shape of a bag, and is expanded by a liquid injected thereinto to closely contact the bore hole wall.

The above are the descriptions of the particularly preferred embodiments of the present invention. The present invention is not limited to these embodiments, and it can be modified extensively within the scope of the appended claims.

What is claimed is:

1. A deadweight dropping-type bore hole wave source comprising:

a laminate comprising a plurality of resilient members and a plurality of plate members piled up in an alternating manner;

a deadweight positioned above said laminate and adapted to be dropped onto said laminate;

wherein said plurality of resilient members and said plurality of plate members are piled up in said alternating manner in a vertical direction; and wherein said plate members are all vertically movable relative to one another.

2. A deadweight dropping-type bore hole wave source as recited in claim 1, wherein said deadweight causes vertical movement of said plate members relative to one another.

3. A deadweight dropping-type bore hole wave source as recited in claim 1, wherein said laminate formed by said resilient members and said plate members is vertically contractible.

4. A deadweight dropping-type bore hole wave source as recited in claim 3, wherein said deadweight causes vertical contraction of said laminate.

5. A deadweight dropping-type bore hole wave source as recited in claim 1, wherein each of said resilient members and said plate members has a substantially circular shape; and each of said resilient members has an outer diameter which is smaller than an outer diameter of each of said plate members.

6. A deadweight dropping-type bore hole wave source as recited in claim 1, wherein each of said resilient members has a horizontal dimension smaller than a horizontal dimension of each of said plate members.

7. A deadweight dropping-type bore hole wave source as recited in claim 1, wherein each of said plate members comprises a ring-shaped disk.

8. A deadweight dropping-type bore hole wave source as recited in claim 7, wherein each of said resilient members comprises a wave-shaped washer.

9. A deadweight dropping-type wave source for use in non-water-holding bore holes, comprising:

a laminate comprising a plurality of resilient members and a plurality of plate members piled up in an alternating manner;

a deadweight positioned above said laminate and adapted to be dropped onto said laminate;

a water-tight expansible cover surrounding said laminate;

means for supplying liquid to an interior of said expansible cover;

wherein said plurality of resilient members and said plurality of plate members are piled up in said alternating manner in a vertical direction; and wherein said plate members are all vertically movable relative to one another.

10. A deadweight dropping-type bore hole wave source as recited in claim 9, wherein said deadweight causes vertical movement of said plate members relative to one another.

11. A deadweight dropping-type bore hole wave source as recited in claim 9, wherein said laminate formed by said resilient members and said plate members is vertically contractible.

12. A deadweight dropping-type bore hole wave source as recited in claim 11, wherein said deadweight causes vertical contraction of said laminate.

13. A deadweight dropping-type bore hole wave source as recited in claim 9, wherein each of said resilient members and said plate members has a substantially circular shape; and each of said resilient members has an outer diameter which is smaller than an outer diameter of each of said plate members.

14. A deadweight dropping-type bore hole wave source as recited in claim 9, wherein each of said resilient members has a horizontal dimension smaller than a horizontal dimension of each of said plate members.

15. A deadweight dropping-type bore hole wave source as recited in claim 9, wherein each of said plate members comprises a ring-shaped disk.

16. A deadweight dropping-type bore hole wave source as recited in claim 15, wherein each of said resilient members comprises a wave-shaped washer.

* * * * *